(12) United States Patent
Murray

(10) Patent No.: US 9,080,926 B2
(45) Date of Patent: Jul. 14, 2015

(54) BEARING LIFE CYCLE PROGNOSTICS

(75) Inventor: Brian Murray, Aberdeen Scotland (GB)

(73) Assignee: AKTIEBOLAGET SKF, Gothenburg (SE)

(*) Notice: Subject to any disclaimer, the term of this patent is extended or adjusted under 35 U.S.C. 154(b) by 580 days.

(21) Appl. No.: 13/392,121

(22) PCT Filed: Aug. 27, 2009

(86) PCT No.: PCT/EP2009/006220
§ 371 (c)(1),
(2), (4) Date: Jun. 5, 2012

(87) PCT Pub. No.: WO2011/023209
PCT Pub. Date: Mar. 3, 2011

(65) Prior Publication Data
US 2012/0239716 A1 Sep. 20, 2012

(51) Int. Cl.
*G06F 3/00* (2006.01)
*G01M 13/04* (2006.01)
*G06F 15/02* (2006.01)
*F16C 41/00* (2006.01)

(52) U.S. Cl.
CPC .............. *G01M 13/04* (2013.01); *F16C 41/004* (2013.01); *F16C 41/007* (2013.01); *F16C 41/008* (2013.01); *G06F 15/025* (2013.01)

(58) Field of Classification Search
CPC ... G06F 15/0225; G06F 15/02; G06F 15/025; G06F 3/04875; G06F 3/0488
USPC ........................................................ 708/160
See application file for complete search history.

(56) References Cited

U.S. PATENT DOCUMENTS

| 6,199,018 | B1 | 3/2001 | Quist et al. |
| 6,490,543 | B1 | 12/2002 | Jaw |
| 2002/0000126 | A1 | 1/2002 | Barclay |
| 2003/0074244 | A1* | 4/2003 | Braxton ........................... 705/7 |
| 2008/0216576 | A1 | 9/2008 | Eckert et al. |

FOREIGN PATENT DOCUMENTS

| CN | 1748189 A | 3/2006 |
| CN | 1934433 A | 3/2007 |
| CN | 101368624 A | 2/2009 |
| EP | 1164550 A2 | 12/2001 |
| EP | 1508880 A2 | 2/2005 |

* cited by examiner

*Primary Examiner* — Tan V. Mai
(74) *Attorney, Agent, or Firm* — Bryan Peckjian; SKF USA Inc. Patent Dept.

(57) ABSTRACT

A life-cycle prognosis is created of a rolling-element bearing. As from manufacturing of the bearing and during the bearing's life-cycle that may include periods of the bearing's non-use, service life data is obtained indicative of one or more factors that occur during the life-cycle and that affect the length of the life-cycle. The service life data is obtained together with identification data that is representative of a machine-readable identifier, applied to the bearing at manufacturing. The identifier serves to uniquely identify the bearing throughout its life. The identification data is used for identifying in a database a history log of the bearing. The service life data is accumulated in the history log of the bearing as from the manufacturing. The history log is used with a specific mathematical life-cycle model for creating an update of the life-cycle prognosis.

8 Claims, 1 Drawing Sheet

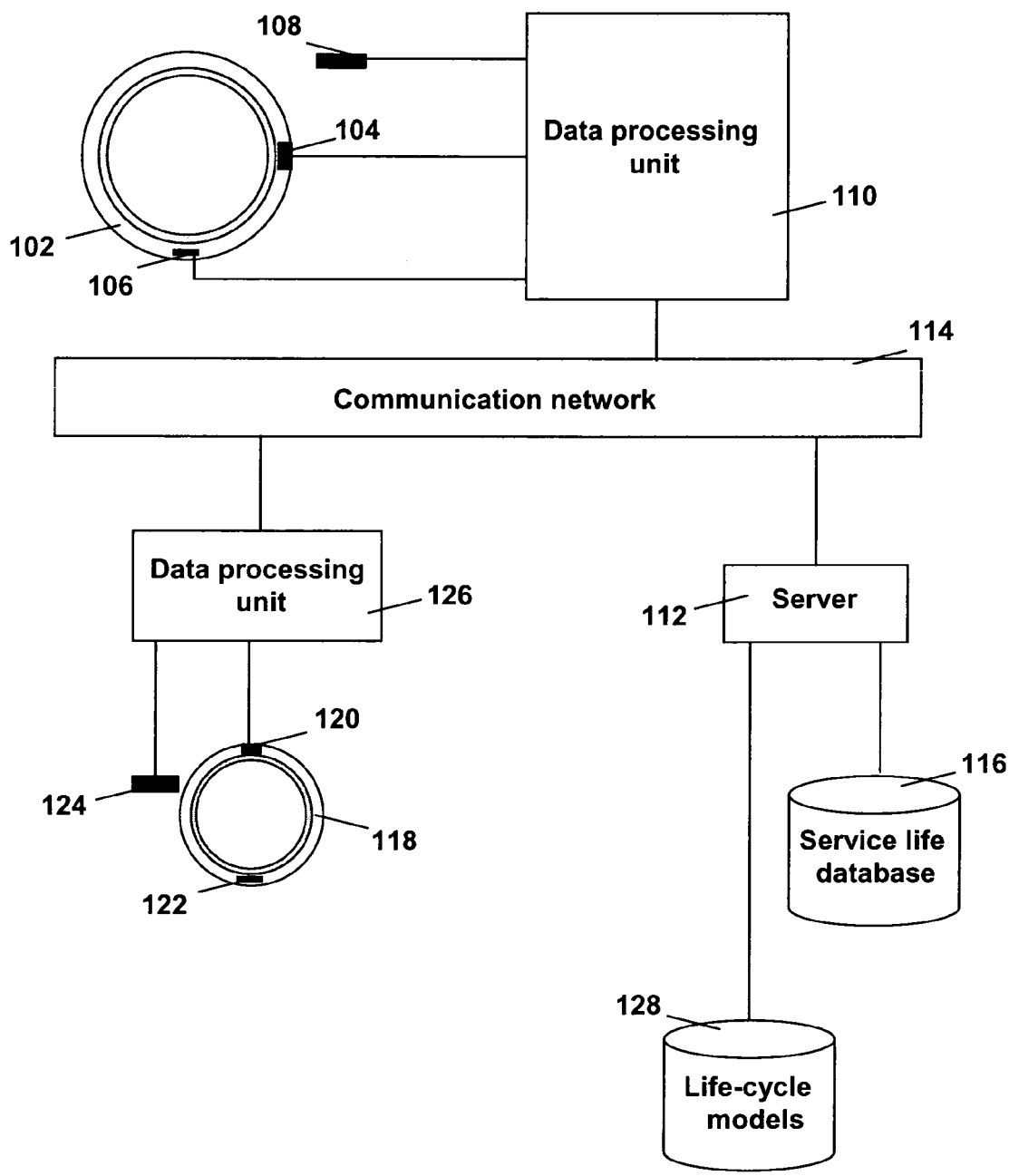

BEARING LIFE CYCLE PROGNOSTICS

CROSS-REFERENCE

This application is the US National Stage of International Application No. PCT/EP2009/006220 filed on Aug. 27, 2009.

FIELD OF THE INVENTION

The invention relates to a method of creating a prognosis of a particular rolling-element bearing. The invention also refers to a rolling-element bearing.

BACKGROUND ART

Rolling-element bearings are often used in critical applications, wherein their failure in service would result in significant commercial loss to the end-user. It is therefore highly relevant to be able to predict the residual life of a bearing, in order to plan intervention in a way that avoids failure in service, while minimizing the losses that may arise from taking the machinery in question out of service to replace the bearing.

The service life of a rolling-element bearing is generally determined by fatigue of the operating surfaces as a result of repeated stresses in operational use. Fatigue failure of a rolling-element bearing results from progressive flaking or pitting of the surfaces of the rolling elements and of the surfaces of the corresponding bearing races. The flaking and pitting cause seizure of one or more of the rolling elements, which in turn generates excessive heat, pressure and friction.

Bearings are selected for a specific application on the basis of a calculated or predicted life expectance compatible with the expected type of service in the application. The length of a service life can be predicted from the nominal operating conditions of speed, load carried, lubrication conditions, etc. For example, a so-called "L-10 life" is the life expectancy in hours during which at least 90% of a specific group of bearings under specific load conditions will still be in service.

However, this type of life prediction is considered inadequate for the purpose of maintenance planning for several reasons. One reason is that the actual operation conditions may be quite different from the nominal conditions used for design purposes. Another reason is that the bearing's life may be radically compromised by short-duration events or unplanned events, such as overloads, lubrication failures, installation errors, etc. Yet another reason is that, even if design operating conditions are accurately reproduced in service, the inherently random character of the fatigue process give rise to large statistical variations in the actual service life of nominally identical bearings.

In order to improve maintenance planning, it is common practice to monitor the values of physical quantities related to vibrations and temperature in operational use, so as to be able to detect the first signs of impending failure. This monitoring is often referred to as "condition monitoring". Condition monitoring brings various benefits. A first benefit is that the user is warned of deterioration in the condition of the bearing in a controlled way, thus minimizing the commercial impact. A second benefit is that condition monitoring helps to identify poor installation or poor operating practices, e.g., misalignment, imbalance, high vibration, etc., that will reduce the life of the bearing if left uncorrected.

European patent application publication EP 1164550 describes an example of a condition monitoring system for monitoring the presence or absence of an abnormality in a machine component such as, for example, a bearing having rolling elements.

SUMMARY OF THE INVENTION

The inventor proposes to provide a quantitative prognosis of the residual life of a bearing, based on a comprehensive view of the bearing's history and usage.

To this end, the inventor proposes a method of creating a prognosis of a life-cycle of a particular rolling-element bearing. The method comprises obtaining service life data and identification data, as from manufacturing of the particular rolling-element bearing and during a life-cycle of the particular rolling-element bearing. The life-cycle includes a period of non-use of the particular rolling elements bearing. The service life data is indicative of one or more factors occurring during the life-cycle of the particular rolling-element bearing and affecting a length of the life-cycle of the particular rolling-element bearing. Examples of such factors are: the rolling contact forces within the bearing; the condition of the lubrication film; the condition of the lubricant with regard to corrosion of the bearing; the temperature of the bearing, the temperature's effect on the viscosity of the lubricant; dynamic loads, raceway damage as indicated by vibration monitoring; and history of mechanical and thermal loads applied to the bearing when it is not operational, e.g., during transport and storage.

The identification data is representative of a machine-readable identifier for uniquely identifying the particular rolling-element bearing. The machine-readable identifier is applied to the particular rolling-element bearing at the manufacturing of the particular rolling-element bearing. The obtained identification data is used for identifying in a database a history log of the particular rolling-element bearing. The obtained service life data is accumulated, as from the manufacturing, in the history log of the particular rolling-element bearing. The history log is then used with a specific mathematical life-cycle model for creating an update of the prognosis.

The invention uses a unique, machine-readable identifier of the rolling-element bearing that stays with it during the bearing's entire life. The unique identifier facilitates the accumulation of service life data per individual bearing as from its being manufactured, including service life data relating to transport, to storage or to other kinds of non-use, to operational use, to relocating, to refurbishment, to re-use, etc. Accordingly, as a result of having service life data accumulated over the bearing's life, starting with its very manufacturing all the way up to the present, a more accurate prediction can be made regarding the residual life of the individual bearing at any point in its life-cycle. Depending on the specific mathematical life-cycle model applied, the end-user is notified of relevant facts including the moment, at which it is advisable to replace or refurbish the rolling-element bearing.

The feature "obtaining the service life data and the identification data" may be implemented in a variety of manners. For example, the party carrying out the method itself controls the creating of the service life data and the identification data and may be running their own data processing system to create the prognosis. As another example, the party carrying out the method receives the service life data and the identification data from a remote location, the creation of the data and the communicating of the data being under control of another party.

The invention also facilitates to provide a service to the end-user or supplier of a rolling-element bearing, by means of enabling to verify if a certain rolling-element bearing is a genuine article or a counterfeit product.

To explain this, consider the following. Illegal manufacturers of rolling-element bearings have a variety of approaches to deceive end-users or Original Equipment Manufacturers (OEMs). For example, they supply new rolling-element bearings of inferior quality, in packages with a false trademark, so as to give the impression that the rolling-element bearings are the genuine products from a trustworthy source. As another example, worn rolling-element bearings are refurbished and then sold without an indication that they have been refurbished. As still another example, very old rolling-element bearings are cleaned and polished, whereupon they are being sold without the buyer knowing the actual age of the rolling-element bearings.

In the invention, each particular rolling-element bearing is given a unique, machine-readable identifier, and the service life data of each particular rolling-element bearing is logged in a database under this unique, machine-readable identifier. Accordingly, if a rolling-element bearing is given a false identity, a check of the database may reveal a discrepancy. For example, the identity of the counterfeit product does not exist in the database, or the service life data gathered for this identity is not consistent with the false rolling-element bearing being checked. As another example, the database indicates for each legitimate rolling-element bearing its age and whether or not the rolling-element bearing was refurbished. Thus, the service of the invention facilitates authenticating a rolling-element bearing.

In an embodiment of the method, the respective service life data of respective ones of multiple rolling-element bearings is accumulated in the database, e.g., maintained by the manufacturer of the rolling-element bearings. Thus, each individual one of a batch of virtually identical rolling-element bearings can be tracked. The service life data gathered in the database for the whole batch of virtually identical bearings enables the manufacturer to extract further information, e.g., about relationships between types or environments of usage versus rates of change of residual life, so as to further improve the service to the end-user.

In a further embodiment of the method of the invention, the specific mathematical life-cycle model is determined from a plurality of mathematical life-cycle models on the basis of the identification data obtained.

In another embodiment of the method of the invention, the method comprises enabling an end-user of the particular rolling-element bearing to do at least one of the following: specifying one or more parameters of the specific mathematical life-cycle model; specifying the specific mathematical life-cycle model; and changing the specific mathematical life-cycle model.

Different ones of the batch of virtually identical rolling-element bearings have typically different histories regarding transport, storage, operational use, etc. Intervention to replace a specific rolling-element bearing is justified, when the cost of intervention (including labor, material and loss of plant output) is justified by the reduction in the risk cost implicit in continued operation. The moment of intervention depends on the specific mathematical life-cycle model used and the individual history.

Different end-users, or different applications, of the same type of rolling-element bearing may therefore warrant using different life-cycle models, giving rise to different expectancies of the residual lives. Also, the same rolling-element bearing may be assessed with respect to different life-cycle models at different times during its service life. For example, the life-cycle model used before and after refurbishment may be different, as the application is different. Changing models is no problem as the complete history of the bearing is known and accessible under the bearing's unique identifier.

The invention also relates to a rolling-element bearing with a machine-readable identifier for uniquely identifying the rolling-element bearing during a life-cycle of the rolling-element bearing. Examples of such machine-readable identifier are markings that are engraved, glued, physically integrated, or otherwise fixed to a side of the rolling-element bearing, or a pattern of protrusions or of other deformations located on the side of the rolling-element bearing. Such identifier is mechanically, optically, electronically, or otherwise readable by a machine.

The invention further relates to a method of creating a prognosis of a life-cycle of a particular rolling-element bearing (102; 118). The method comprises as from manufacturing of the particular rolling-element bearing and during a life-cycle of the particular rolling-element bearing, the life-cycle including a period of non-use of the particular rolling elements bearing, obtaining service life data, indicative of one or more factors occurring during the life-cycle of the particular rolling-element bearing and affecting a length of the life-cycle of the particular rolling-element bearing, and identification data, representative of a machine-readable identifier, applied to the particular rolling-element bearing at the manufacturing of the particular rolling-element bearing, for uniquely identifying the particular rolling-element bearing. The obtained identification data is used for identifying in a database (116) a history log of the particular rolling-element bearing. The obtained service life data is accumulated, as from the manufacturing, in the history log of the particular rolling-element bearing. The history log is used with a specific mathematical life-cycle model for creating an update of the prognosis.

Preferably the specific mathematical life-cycle model is determined from a plurality of mathematical life-cycle models on the basis of the identification data. The identification data suitably will give information on bearing type, which is then matched with an appropriate life-cycle model. Suitably an end-user of the particular rolling-element bearing is enabled to do at least one of specifying one or more parameters of the specific mathematical life-cycle model, or specifying the specific mathematical life-cycle model or changing the specific mathematical life-cycle model.

The invention still further relates to a rolling-element bearing (102) with a machine-readable identifier for uniquely identifying the rolling-element bearing during a life-cycle of the rolling-element bearing.

Any above described feature can be combined with any other described feature as long as there is no conflict.

BRIEF DESCRIPTION OF THE DRAWING

The invention is explained in further detail, by way of example and with reference to the accompanying drawing, wherein FIG. 1 is a block diagram of a system in the invention.

DETAILED EMBODIMENTS

In order to create the life-cycle prognosis according to the invention, the rolling-element bearing in the invention has a machine-readable identifier functionally and physically integrated with it. For example, the identifier is implemented using an electronic device, e.g., an RFID tag, securely attached to the rolling-element bearing, or a unique marked code engraved, which physically or electronically uniquely identifies the bearing from manufacture, through shipping to installation and operation. This identity remains with the bearing even if the bearing is removed to a different location or if the bearing is refurbished.

Instruments record exposure of the bearing to one or more of stress, vibration, temperature and other sources of wear and degradation, and communicate this service life data to a central database, together with data representative of the unique identifier. Accordingly the complete history of the individual bearing is available and is used by a mathematical or empirical model to predict the residual life of the individual bearing at any point in its life-cycle.

In carrying out such a prognosis, it is needed to record the history of rolling-contact forces and revolutions in order to compute the residual life from a traditional bearing life model. In practice, however, the majority of bearings fail because of issues not addressed by a traditional life model, as described earlier. Depending on the application, some or all of the following will be required for life prognosis: the rolling-contact forces within the bearing; the condition of the lubrication film; the condition of the lubricant with regard to corrosion of the bearing; the temperature of the bearing and its effect on the viscosity of the lubricant; dynamic loads and raceway damage as indicated by vibration monitoring; a history of vibration applied to the bearing in periods of non-use.

In more detail, the whole process can be considered as hinging on the following steps: identification, sensing, communication and life prognosis.

As to sensing: in order to predict the residual life of a bearing, a variety of parameters is required to be measured throughout the bearing's life. In order to accurately track the history of a single bearing through all phases of its life, the identity (e.g., a serial number) of the bearing must be recorded and associated with the measured service life data. Examples of service life data are the following.

Rolling contact forces are conveniently recorded by a strain sensor located on an outer surface or side of the bearing's outer ring, or on an inner surface or inner side of the bearing's inner ring. Such a strain sensor could be of the resistance type or use the stretching of an optical fiber embedded within the bearing. The lubrication film can be compromised by excessive load, low viscosity of the lubricant or contamination of the lubricant with particulate material, or a lack of lubricant. The condition of the lubrication film can be assessed by detecting high-frequency stress waves that propagate through the bearing rings and the surrounding structure in the event of a breakdown of the lubrication film. Such a sensor may be embedded in the bearing ring or attached externally to the bearing housing. Even though a lubrication film is effective, the lubricant can be degraded by contamination in several ways. For example, the film may fail to protect the bearing against corrosion, either because of its water content or the entrainment of corrosive materials, e.g., acid, salt, etc. As another example, the film may be contaminated with solid material that has an abrasive effect on the raceway.

As to communication: in an industrial setting, many bearings may require to be monitored. In order to be cost-effective, it is therefore desirable that the bearing's health data and usage data be collected automatically, whether they are communicated via wired connection or wirelessly, or a combination thereof. The invention therefore introduces the idea, that a bearing carries a unique identity, in machine-readable format, and that instrumentation embedded within, or close to or attached to, the bearing, communicates the bearing's usage history as associated with that identity. This identity follows the bearing as it is moved from location to location. The identity enables to track the total life-cycle usage and environmental exposure of the bearing, including shipping and storage, operation, non-operational periods when installed, refurbishment, re-use, etc.

If an appropriate wireless communication protocol such as that described in IEEE802.15.4 is employed, a new bearing installed on site will announce its presence and software developed for the purpose will communicate its unique digital identity. Appropriate database functionality then associates that identity and location with the previous history of that bearing.

As to prognosis: the objective of the system according to the invention is to advise a user of residual life, in other words, at what point in time the user should replace the bearing. This is an economic decision. The end of a bearing life can be viewed as being when the commercial risk associated with its continued operation exceeds the cost of intervention. The precise calculation can vary between applications. A simple formulation of a manner to decide when the end of life of a bearing has come is the following.

Intervention to replace the bearing is justified, when the cost of intervention (including labor, material and loss of, for example, plant output) is justified by the reduction in the risk cost implicit in continued operation. The risk cost may be calculated as the product of the probability of failure in service on the one hand, and the financial penalty arising from such failure in service, on the other hand. A critical element in the life prognosis is then that of computing the probability of failure within a specified time interval. There are two stages to this calculation.

First, a traditional life calculation can be carried out (for example that embodied in ISO281), but using measured load and revolution history, instead of assumed or predicted load and revolution history, together with the expected future operating conditions to predict a base probability of failure.

Second, account must be taken of the effect of factors that lie outside the scope of traditional life models. Such factors include: exposure of the bearing to corrosion (e.g., through the presence of water in the lubricating oil over a period of time); exposure of the bearing to fretting damage when in non-rotating condition; exposure of the bearing to transient load conditions; exposure of the bearing to transient or continuous conditions that cause the lubrication film to break down. These factors can be accommodated by a mixture of theoretical and empirical models, based on the measurements previously outlined.

A special case exists, when there is an opportunity to refurbish (remanufacture) a bearing. A user can then gain economic advantage by taking a bearing out of service for refurbishment before significant damage occurs that would preclude refurbishment. In this case, the economic argument for when to refurbish would be based on an assessment of the bearing's life history, current usage, and hence the probability of damage (that would preclude refurbishment) occurring in a defined future time interval.

Finally, in the later stages of life, after damage to the bearing is detected by conventional condition monitoring, a further empirical model can predict the probability of failure within a defined time frame, utilizing the measurements of the operating environment, notably load, speed, lubrication condition and fretting.

FIG. 1 is a system 100 according to the invention illustrating the above. The system 100 comprises a first rolling-element bearing 102 provided with a machine-readable identifier that uniquely identifies the first rolling-element bearing 102. The machine-readable identifier of the first rolling-element bearing 102 is implemented by way of identification data stored in a first data carrier 104, e.g., a one-time programmable semiconductor memory of an integrated circuit, or implemented in any other suitable format that is machine-readable and that has the machine-readable identifier permanently attached or otherwise physically integrated with the first rolling-element bearing 102. Examples of such other machine-readable formats are markings, protrusions, or deformations, being located on the side of the first rolling-element bearing 102, and being mechanically, optically, or electronically readable.

The system 100 further comprises one or more first sensors, such as first sensors 106 and 108, that are operative to sense current values of physical quantities representative of one or more factors that determine a service life of the first rolling-element bearing 102. The first sensors 106 and 108 sense, e.g., the rolling-contact forces within the first rolling-element bearing 102; the condition of the lubrication film; the condition of the lubricant with regard to corrosion of the first rolling-element bearing 102; the temperature of the first rolling-element bearing 102; dynamic loads and raceway damage as indicated by vibrations picked up by an appropriate type of sensor, etc. Any or all of the first sensors 106 and 108 may be integrated with the first rolling-element bearing 102. Alternatively, any or all of the first sensors 106 and 108 may be positioned in the vicinity of, and externally to, the first rolling-element bearing 102. For example, the first sensors 106 and 108 are mounted on the apparatus (not shown) of which the first rolling-element bearing 102 forms a functional part in operational use. As another option, the first sensors 106 and 108 are accommodated in a casing designed for storage and/or transport of the first rolling-element bearing 102 so as to monitor the influences from the environment that co-determine the service life of the first rolling-element bearing 102 when not in operational use: e.g., ambient temperature, air pressure, air humidity, salinity or acidity, chemical contamination of the ambient air, etc., and mechanical shocks and other accelerations induced by transport of the first rolling-element bearing 102. For clarity, the first sensors 106 and 108 in system 100, depicting operational use of the first rolling-element bearing 102, may differ from the first sensors 106 and 108 in system 100 depicting storage or transport of the first rolling-element bearing 102. The difference may relate to, for example, a location of the first sensors 106 and 108 relative to the first rolling-element bearing 102 (e.g., at the first rolling-element bearing 102 or in its vicinity), or the physical quantity sensed (e.g., mechanical impacts, as measured through accelerometers, are more likely to occur during transport than in operational use).

The first data carrier 104 communicates the identification data to a first data processing unit 110. Likewise, the first sensors 106 and 108 transmit signals to the first data processing apparatus 110. The signals are representative of the magnitude of the physical quantities sensed.

The first data carrier 104 preferably communicates with the first data processing unit 110 via a wired connection. If the first data carrier 104 is suitable for being wired to the first data processing unit 110, the first data carrier 104 may also be suitable for receiving its power via a wired connection with a suitable power supply (not shown), e.g., functionally integrated with the first data processing unit 110 or accommodated in another device (not shown).

Alternatively, the first data carrier 104 communicates in a wireless manner with the first data processing unit 110. The first data carrier 104 may then accommodate its own power supply, e.g., a battery, or energy scavenging means. As known, energy harvesting (also known as power harvesting or energy scavenging) is the process by which energy is derived from external sources (e.g., solar power, thermal energy, wind energy, salinity gradients and kinetic energy), captured and stored. Frequently this term is applied when speaking about small, wireless autonomous devices, such as those used in wearable electronics and wireless sensor networks.

As another option, the first data earner is implemented as an RFID tag whose circuitry receives its power from incident electromagnetic radiation generated by an external source, e.g., the first data processing unit 110 or another device (not shown) controlled by the first data processing unit 110.

Similarly, one or more of the sensors, e.g., one or more of the first sensors 106 and 108, preferably communicate with the first data processing unit 110 via a wired connection, or the one or more of the first sensors 106 and 108 communicate in a wireless manner with the first data processing unit 110. If the first sensors 106 and 108 are configured for wireless communication, they may accommodate their own power supply, e.g., a battery, or power storage with energy scavenging means. Alternatively, the first sensors 106 and 108 may be implemented as RFID tags.

The first data processing unit 110 optionally pre-processes the identification data and the signals received from the first sensors 106 and 108. The signals are converted, re-formatted or otherwise processed so as to generate life service data representative of the magnitudes sensed. The first data processing unit 110 communicates the identification data and the service life data to a server 112, via a communication network 114, e.g., a telecommunications network or the Internet. The server 112 logs the service life data in a service life database 116 under control of the identification data, thus building a history of the first rolling-element bearing 102 by means of accumulating the service life data over time.

Similarly, the system 100 comprises a plurality of further rolling-element bearings of which only a second rolling-element bearing 118 is shown in order to not obscure the drawing. What will be discussed below with regard to the second rolling-element bearing 18 is similarly applicable to any further rolling-element bearing, mutatis mutandis. The second rolling-element bearing 118 is provided with a machine-readable identifier that uniquely identifies the second rolling-element bearing 118. The machine readable-identifier of the second rolling-element bearing 118 is, for example, implemented by way of identification data stored in a second data carrier 120. What has been discussed above with regard to the first data carrier 104 applies, mutatis mutandis, to second data carrier 120. The system 100 also comprises second sensors 122 and 124 monitoring the second rolling-element bearing 118. What has been discussed above with regard to the first sensors 106 and 108 applies, mutatis mutandis, to the second sensors 122 and 124. The system 100 further comprises a second data processing unit 126 that receives from the second data carrier 120 the unique identification of the second rolling-element bearing 118, and that receives from the second sensors 122 and 124 the signals indicative of the current service life. The second data processing unit 126 converts the signals to service life data for this second rolling-element bearing 118 and transmits this service life data, together with the unique identifier of the second rolling-element bearing 118, to the server 112. Accordingly, the server 112 accumulates identification data and service life data about all rolling-element bearings, such as the first bearing 102 and the second bearing 118, whose identification data and service life data are received via the communication network 114.

The first and/or second data processing units 110 and 126 may be instructed to automatically submit the identification data and the service life data to the server 112, for example, on a regular basis, or randomly, or upon request from the server 112 or its operator. The latter option requires that the data connection between the server 112 and the first and/or second data processing unit is bi-directional. The capability of the server 112 or its operator to initiate the retrieval of the service life data may be relevant to, for example, rolling-element bearings that are is use in a region or geographic location that has just been subjected to extreme conditions such as an earthquake, tornadoes, a hurricane, a flooding, a fire, extremely high or extremely low temperatures, etc. The server 112 or its operator can then decide to retrieve service life data at a higher resolution on the time scale in order to more closely monitor the status of the relevant rolling-element bearings as events.

The server 112 has available one or more life-cycle models that can be applied in order to process the accumulated service life data of the first rolling-element bearing 102 and of the second rolling-element bearing 118. This is illustrated by a storage 128 that stores the life-cycle models as different software applications. The differences between the life-cycle models may reside in, e.g., different mathematical relationships between selected ones of the factors that determine service life of a rolling-element bearing. Different fields of applications of a same type of rolling-element bearing may need different models, for example, because the dominant factors determining service life differ per field of application, or because the model used to determine residual service life of a new bearing differs from the model that is used to determine residual service life of a refurbished bearing. Also, different models may be based on different criterions, specified in advance by the end-user, that take into account the economic considerations about when it will be advantageous to this end-user to replace or refurbish the bearing.

Above infrastructure of the system 100 hinges on the fact that each rolling-element bearing in the invention comprises a machine-readable identifier in, for example, a data carrier, for uniquely identifying the rolling-element bearing among other rolling-element bearings. This enables the following business-model. The manufacturer assigns a unique identifier to each rolling-element bearing made and has the unique identifier stored permanently and in machine-readable format at the rolling-element bearing itself. As of the manufacturing of a particular rolling-element bearing until its shipping, the service life data of this particular rolling-element bearing is accumulated via sensors, for example, at the premises of the manufacturer and stored in the service life database 116 as associated with the unique identifier of this particular rolling-element bearing. Before shipping, the rolling-element bearing is packaged in a container that is provided with sensors, a data buffer, and a power supply. Alternatively, the sensors are permanently attached to the rolling-element bearing and are connected to a data buffer in the container. During shipping, the sensors register the magnitudes of the forces, the type and concentration of chemicals, the level of moisture, etc., to which this rolling-element bearing is being subjected. This information is buffered as service life data in the buffer, preferably together with time stamps. Upon arrival at the destination, the buffer is read, e.g., by a hand-held data processing device, and the read data is transmitted to the server 112 via the communication network 114. If the rolling-element buffer is kept in storage while in the container, the sensors continue to register the environmental influences and this information is buffered in the buffer as service life data. Upon unpacking, the data is read from the buffer and transmitted to the server 112 via the communication network 114. Further sensors may be temporarily attached to the rolling-element bearing for registering the environmental influences during installation, again so as to collect service life data representative of this part of the service life rolling-element bearing. If the sensors have been permanently attached to the rolling-element bearing during manufacturing, these can be used instead for the same purpose. Once the rolling-element bearing has been installed at the end-user and put into operational use, the permanently attached sensors and, optionally, any additional sensors, register the environmental influences which are then converted to the service life data submitted to the server 112 via the communication network 114. The submitting of the service life data after the rolling-element bearing has left the manufacturer may be made a mandatory requirement for receiving warranty given by manufacturer that defective parts will be repaired or replaced within a given time limit and under certain conditions.

Now, each end-user of a rolling-element bearing, whose service life data have been collected as of manufacturing, can benefit from the service provided by the server 112. Each end-user may specify to the server 112, for each individual one of his/her rolling-element bearing, the financial penalty arising from a failure of the individual rolling-element bearing in service, and update the financial penalty specified previously e.g., when economic circumstances change. Each individual rolling-element bearing, registered with the server 112, is monitored, and its service life data is accumulated on an ongoing basis. Based on the financial penalty indicated by the end-user and possibly based on other criterions, a tailor-made life-cycle model is selected in order to determine the current status of each of his/her rolling-element bearings. Depending on the results of applying the selected life-cycle model, the end-user is notified of the moment in time at which it is advisable to service, replace or refurbish, a relevant one of his/her rolling-element bearings. Notification can be done via, e.g., the communication network 114 and this end-user's data processing unit, via an email or telephone, a letter, a visiting representative of the manufacturer, etc.

As mentioned above, service life database 116 accumulates the service life data of a plurality of rolling-element bearings. Consider the set of service life data belonging to those rolling-element bearings that are of an identical design or type. These rolling-element bearings of identical design are easy to identify based on their unique identifications. The identical rolling-element bearings are typically in use at different end-users, in different physical and/or chemical environments, in different technical applications, and are being subjected to different combinations of factors determining their individual service lives. The service life data in the database 116 associated with these identical rolling-element bearings allow an analysis of the service life of this type of bearing subjected to a variety of influences. This may be highly interesting to the manufacturer as he would not be able to run such an extensive and expensive experiment himself. Accordingly, the accumulated real-life service life data itself represent a commercial value to the manufacturer as it enables the manufacturer to process this data as if it were an extensive experiment, on the basis of which he can further optimize the design or reduce costs.

Preferably, the first and second data processing units 110 and 126 or the server 112, or both, label the service life data with a time stamp upon receipt. The time stamps enable to interpolate or extrapolate the ongoing consumption of the service life of the first and second rolling-element bearings 102 and 118 using relevant ones of the life-cycle models in storage 128.

The invention claimed is:
1. A method of creating a prognosis of a life-cycle of a particular rolling-element bearing, the method comprises:

obtaining service life data, indicative of one or more factors occurring during the life-cycle of the particular rolling-element bearing and affecting a length of the life-cycle of the particular rolling-element bearing;

obtaining identification data, representative of a machine-readable identifier, applied to the particular rolling-element bearing at the manufacturing of the particular rolling-element bearing, for uniquely identifying the particular rolling-element bearing;

using the obtained identification data for identifying in a database a history log of the particular rolling-element bearing;

accumulating the obtained service life data, as from the manufacturing, in the history log of the particular rolling-element bearing; and by operation of a data processing unit, using the history log with a specific mathematical life-cycle model for creating an update of the prognosis, wherein the prognosis of the particular rolling-element bearing is created over a time span that begins as of a date manufacture and extends through the life-cycle and including a period of non-use.

2. The method of claim 1, further comprising determining the specific mathematical life-cycle model from a plurality of mathematical life-cycle models on the basis of the identification data.

3. The method of claim 2, further comprising enabling an end-user of the particular rolling-element bearing to do at least one of the following:

specifying one or more parameters of the specific mathematical life-cycle model;

specifying the specific mathematical life-cycle model; and changing the specific mathematical life-cycle model.

4. The method of claim 1, wherein at least a portion of the service life data is obtained during the period of non-use.

5. The method of claim 4, wherein the service life data obtained during the period of non-use includes vibrations experienced by the particular rolling-element bearing.

6. The method of claim 4, wherein the period of non-use includes when the particular rolling-element bearing is positioned within a package and is being shipped to a destination.

7. The method of claim 4, wherein the period of non-use includes when the particular rolling-element bearing is kept in storage.

8. The method of claim 4, wherein the period of non-use includes when the particular rolling-element bearing is being installed before a first use of the particular rolling-element bearing.

* * * * *